US012801458B2

(12) United States Patent
Takazawa et al.

(10) Patent No.: US 12,801,458 B2

(45) Date of Patent: Nov. 17, 2026

(54) VEHICLE-MOUNTED COMPUTER, COMPUTER EXECUTION METHOD, AND COMPUTER PROGRAM

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Tadahiro Takazawa, Yokkaichi (JP); Koji Yasuda, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 677 days.

(21) Appl. No.: 18/258,794

(22) PCT Filed: Dec. 6, 2021

(86) PCT No.: PCT/JP2021/044617

§ 371 (c)(1),
(2) Date: Jun. 21, 2023

(87) PCT Pub. No.: WO2022/138096

PCT Pub. Date: Jun. 30, 2022

(65) Prior Publication Data

US 2024/0036941 A1 Feb. 1, 2024

(30) Foreign Application Priority Data

Dec. 22, 2020 (JP) ................................ 2020-212789

(51) Int. Cl.

*G06F 9/46* (2006.01)
*G06F 9/455* (2018.01)

(Continued)

(52) U.S. Cl.

CPC ........ *G06F 9/5088* (2013.01); *G06F 9/45558* (2013.01); *G06F 9/4812* (2013.01); *G06F 2009/4557* (2013.01); *G06F 2201/815* (2013.01)

(58) Field of Classification Search

CPC ..................................................... G06F 9/5088

(Continued)

(56) References Cited

U.S. PATENT DOCUMENTS 8,489,744 B2 * 7/2013 Elyashev ............ H04L 67/1001 718/1
10,534,652 B1 * 1/2020 Dugar ................... G06F 9/5083

(Continued)

FOREIGN PATENT DOCUMENTS

JP 2008-217302 A 9/2008
JP 2014-049013 A 3/2014
JP 2014-203232 A 10/2014

OTHER PUBLICATIONS

International Search Report, Application No. PCT/JP2021/044617, mailed Jan. 11, 2022. ISA/Japan Patent Office.

*Primary Examiner* — Mehran Kamran

(74) *Attorney, Agent, or Firm* — Brooks Kushman P.C.

(57) ABSTRACT

A vehicle-mounted computer, which includes physical resources including a processor with a plurality of three or more cores and a physical device having a register, and generates a plurality of three or more virtual devices by allocating the physical resources through time-division, determines whether or not the multiple cores are operating, and if it is determined that one core is not operating, specifies the core that is the migration destination based on the change amount of a register value of the physical device used when migrating the virtual device that was operating on (Continued)

the one core to the other cores, and migrates the virtual device that was operating on the one core.

16 Claims, 13 Drawing Sheets

(51) Int. Cl.
*G06F 9/48* (2006.01)
*G06F 9/50* (2006.01)

(58) Field of Classification Search
USPC .......................................................... 718/104
See application file for complete search history.

(56) References Cited

U.S. PATENT DOCUMENTS 11,126,474 B1 * 9/2021 Zidenberg ............. G06F 9/5016
11,320,797 B2 * 5/2022 Nixon ................. G06F 11/1484
2008/0163239 A1 * 7/2008 Sugumar ............. G06F 9/45558 718/105
2011/0113431 A1 * 5/2011 Shidai ................... G06F 9/4887 718/103
2011/0131577 A1 * 6/2011 Nojiri ................... G06F 9/4411 718/1
2012/0054762 A1 * 3/2012 Moon ................... G06F 9/5077 718/103
2013/0125113 A1 * 5/2013 Do .......................... G06F 9/455 718/1
2014/0164662 A1 * 6/2014 van Schaik ............. G06F 13/34 710/265
2014/0297964 A1 * 10/2014 Nakase ............... G06F 12/1009 711/136
2015/0040131 A1 * 2/2015 Shan ..................... G06F 9/5077 718/1
2015/0277955 A1 * 10/2015 Iwamatsu ........... G06F 9/45558 718/1
2015/0347166 A1 * 12/2015 Noel ..................... G06F 9/4856 718/1
2015/0378762 A1 * 12/2015 Saladi ................. H04L 41/0895 718/1
2016/0092140 A1 * 3/2016 Santaniello ........... G06F 9/5088 709/224
2017/0083998 A1 * 3/2017 Acharya ................... G06T 1/60
2017/0177407 A1 * 6/2017 Therien ................. G06F 9/5094
2017/0357527 A1 * 12/2017 Srinivas .............. G06F 9/45558
2018/0295301 A1 * 10/2018 Lee ........................ H04N 23/69
2019/0079790 A1 * 3/2019 Tagashira ............ G06F 9/45558
2020/0257554 A1 * 8/2020 Okuno .................. G06F 9/5077
2020/0326967 A1 * 10/2020 Hayes ................. G06F 9/45558
2020/0326987 A1 * 10/2020 Willcock .............. G06F 9/5016
2020/0379927 A1 * 12/2020 Chan ................... G06F 12/0875
2021/0019170 A1 * 1/2021 Sugano ................... G06F 11/07
2021/0073035 A1 * 3/2021 Duluk, Jr. ............. G06F 9/5016
2021/0318745 A1 * 10/2021 Manousakis ........ G06F 9/45558
2021/0383206 A1 * 12/2021 Teppoeva ............... G06N 3/044
2024/0036941 A1 * 2/2024 Takazawa ................. G06F 9/48
2024/0054002 A1 * 2/2024 Takazawa ........... G06F 9/45533
2024/0303103 A1 * 9/2024 Yasuda ................. B60R 16/023

* cited by examiner

FIG. 5

11e

| Virtual Device | First physical device | Second physical device | Third physical device |
|---|---|---|---|
| VM[0] | A_0 | B_0 | N/A |
| VM[1] | A_0 | B_0 | C_0 |
| VM[2] | A_0 | B_1 | N/A |
| ... | ... | ... | ... |

FIG. 6A

Setting of second physical device: B_0

| Identifier (address) | Setting value |
|---|---|
| 0x4000_000 | XXXX |
| 0x4000_004 | YYYY |
| 0x4000_008 | ZZZZ |

FIG. 6B

Setting of second physical device: B_1

| Identifier (address) | Setting value |
|---|---|
| 0x4000__000 | AAAA |
| 0x4000__004 | BBBB |
| 0x4000__008 | CCCC |

VEHICLE-MOUNTED COMPUTER, COMPUTER EXECUTION METHOD, AND COMPUTER PROGRAM

CROSS-REFERENCE TO RELATED APPLICATIONS

This application is the U.S. national stage of PCT/JP2021/044617 filed on Dec. 6, 2021, which claims priority of Japanese Patent Application No. JP 2020-212789 filed on Dec. 22, 2020, the contents of which are incorporated herein.

TECHNICAL FIELD

The present disclosure relates to a vehicle-mounted computer, a computer execution method, and a computer program.

BACKGROUND

A vehicle is equipped with a plurality of electronic control units (hereinafter referred to as ECUs) connected to a vehicle-mounted network. In recent years, accompanying higher functionality of vehicles, such as the introduction of advanced driver-assistance systems (ADAS), automatic driving technology, and artificial intelligence technology, the number of ECUs installed in vehicles is increasing. Also, close cooperation between ECUs prepared for each function such as a power train system, a body system, and a chassis system is becoming necessary.

In view of this, consideration has been given to integrating and aggregating the functions of a plurality of ECUs installed for each function, into a specific vehicle-mounted computer. The vehicle-mounted computer integrates the functions of various ECUs by generating each ECU as a virtual device using virtualization technology, for example, and executing a program for realizing the function of each ECU on the virtual device.

The processor of the vehicle-mounted computer schedules tasks relating to virtual devices that reproduce a plurality of ECUs and programs on the virtual devices, and switches and executes the tasks related to each virtual device.

When there is a desire to cause a vehicle-mounted computer equipped with a processor with a plurality of cores to operate more stably, it is conceivable to migrate a virtual device operating on the core to another core.

On the other hand, in an embedded processor installed in a vehicle-mounted computer, if a virtual device is to be migrated from one core to another core, the vehicle-mounted computer needs to change the state of a plurality of physical devices, such as an SCB (System Control Block), MMU (Memory Protection Unit), and other peripherals, that is, the register values of the physical devices, as well.

The prior art does not disclose a technique for migrating a virtual device with consideration given to the processing load of performing a setting change of register values of physical devices in a vehicle-mounted computer equipped with a processor with a plurality of cores.

An object of the present disclosure is to provide a vehicle-mounted computer, a computer execution method, and a computer program according to which, if one core of a multi-core processor is not operating normally, it is possible to perform migration of a virtual device with consideration given to a processing load of performing a setting change of register values of physical devices when the virtual device that was operating in the one core is migrated to any one of the other plurality of cores.

An object of the present disclosure is to provide a vehicle-mounted computer, a computer execution method, and a computer program according to which, in order to cause a vehicle-mounted computer equipped with a processor with a plurality of cores to operate more stably, it is possible to perform migration of a virtual device with consideration given to a processing load of performing a setting change of register values of physical devices when a virtual device that was operating on one core of a multi-core processor is migrated to any one of the other plurality of cores.

SUMMARY

A vehicle-mounted computer according to one aspect of the present disclosure is a vehicle-mounted computer including a physical resource including a processor with three or more cores and a physical device having a register, the vehicle-mounted computer generating three or more virtual devices by allocating the physical resource through time-division, in which the processor determines whether or not the plurality of cores are operating, if one of the cores is not operating, specifies the core that is a migration destination of the virtual device that was operating on the one core, based on a change amount of a register value of the physical device or processing time needed for changing a register value of the physical device when the virtual device is migrated to the other cores, and migrates the virtual device that was operating on the one core to the specified core that is the migration destination.

A computer execution method according to one aspect of the present disclosure is a computer execution method to be performed by a vehicle-mounted computer that includes a physical resource including a processor with a plurality of three or more cores and a physical device having a register, and generates a plurality of three or more virtual devices by allocating the physical resource through time-division, the method including: determining whether or not the plurality of cores are operating, specifying, if one of the cores is not operating, the core that is a migration destination of the virtual device that was operating on the one core, based on a change amount of a register value of the physical device or processing time needed for changing a register value of the physical device when the virtual device is migrated to the other cores, and migrating the virtual device that was operating on the one core to the specified core that is the migration destination.

A computer program according to one aspect of the present disclosure is a computer execution program for causing a vehicle-mounted computer, that includes a physical resource including a processor with a plurality of three or more cores and a physical device having a register, and generates a plurality of three or more virtual devices by allocating the physical resource through time-division, to execute: determining whether or not the plurality of cores are operating, specifying, if one of the cores is not operating, the core that is a migration destination of the virtual device that was operating on the one core, based on a change amount of a register value of the physical device or processing time needed for changing a register value of the physical device when the virtual device is migrated to the other cores, and migrating the virtual device that was operating on the one core to the specified core that is the migration destination.

Note that the present application can be realized not only as a vehicle-mounted computer having such a characteristic processor, but also as a computer execution method having such characteristic processing as steps, or as a computer program for causing a computer to execute such a step. Also, the present application can be realized as a semiconductor integrated circuit that realizes part or all of the vehicle-mounted computer, or another system including the vehicle-mounted computer.

Advantageous Effects

According to the present disclosure, it is possible to provide a vehicle-mounted computer, a computer execution method, and a computer program according to which, in order to cause a vehicle-mounted computer equipped with a multi-core processor to operate more stably, it is possible to perform migration of a virtual device with consideration given to the processing load of performing a setting change of register values of physical devices when migrating a virtual device that was operating on one core of the multi-core processor to any one of the other plurality of cores.

BRIEF DESCRIPTION OF DRAWINGS

FIG. 5 is a conceptual diagram showing an example of a device configuration table.

FIG. 6A is a conceptual diagram showing an example of a setting value of a second physical device.

FIG. 6B is a conceptual diagram showing an example of a setting value of a second physical device.

DETAILED DESCRIPTION OF PREFERRED EMBODIMENTS

Figure 1:
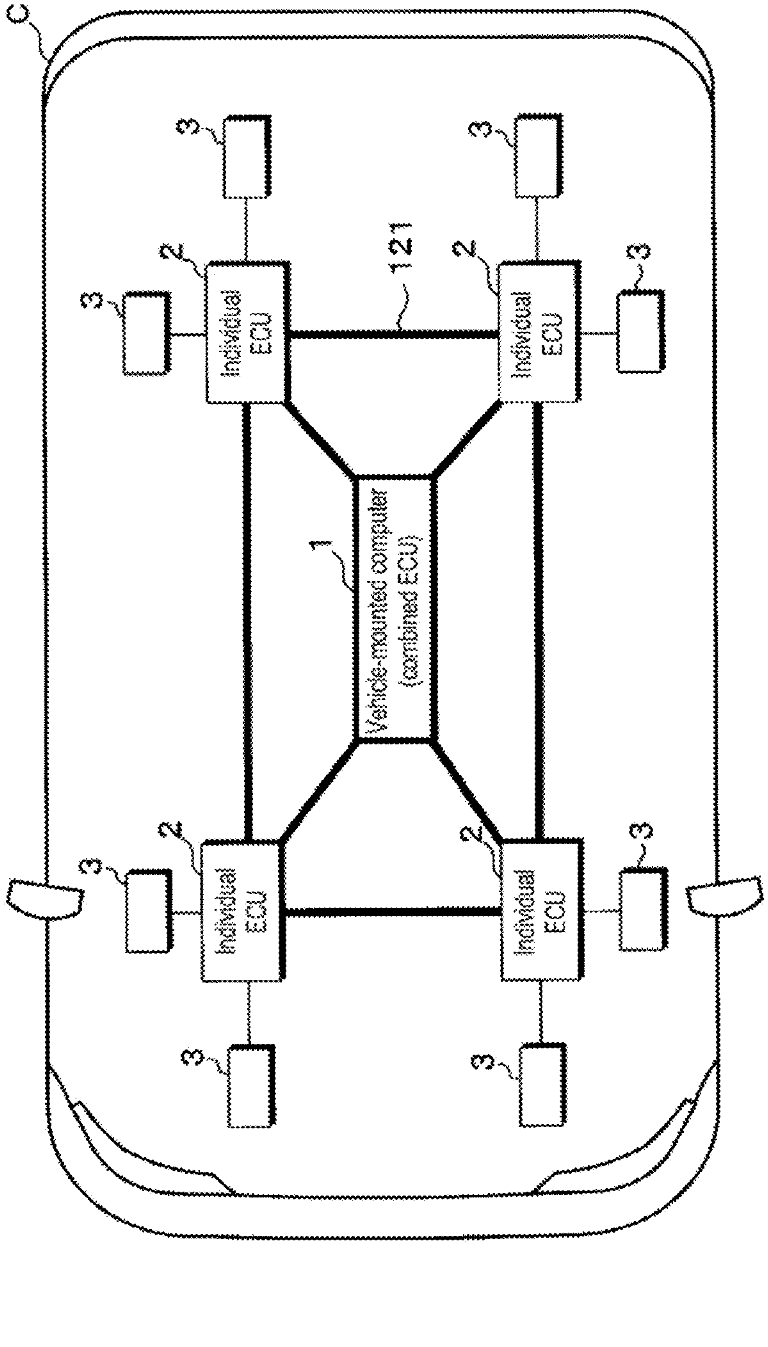
FIG. 1 is a block diagram showing a network configuration of a vehicle-mounted communication system.

First, embodiments of the present disclosure are listed and described. In addition, at least some of the embodiments described below may be combined as appropriate.

A vehicle-mounted computer according to one aspect of the present disclosure is a vehicle-mounted computer including a physical resource including a processor with three or more cores and a physical device having a register, the vehicle-mounted computer generating three or more virtual devices by allocating the physical resource through time-division, in which the processor determines whether or not the plurality of cores are operating, if one of the cores is not operating, specifies the core that is a migration destination of the virtual device that was operating on the one core, based on a change amount of a register value of the physical device or processing time needed for changing a register value of the physical device when the virtual device is migrated to the other cores, and migrates the virtual device that was operating on the one core to the specified core that is the migration destination.

In this aspect, in order to cause the vehicle-mounted computer to operate more stably, when one core of the processor is not operating normally, the virtual device that was operating on the one core is migrated to the other cores. At this time, the processor specifies the core that is the migration destination of the virtual device based on the change amount of the register value of the physical device or the processing time needed for changing the register value of the physical device when the virtual device is migrated to the other cores, and migrates the virtual device that was operating on the one core to the specified core that is the migration destination.

Accordingly, it is possible to migrate the virtual device with consideration given to the change amount of the register value of the physical device or the processing time needed for changing the register value of the physical device.

With the vehicle-mounted computer according to one aspect of the present disclosure, the processor preferably has a configuration in which the processor specifies, as the core that is the migration destination, the core with the smallest change amount of the register value of the physical device when the virtual device that was operating on the one core is migrated to the other cores.

In this aspect, the processor can specify the core that is the migration destination of the virtual device with the smallest change amount of the register value of the physical device, and can migrate the virtual device that was operating on the one core to another core.

With the vehicle-mounted computer according to one aspect of the present disclosure, the processor preferably has a configuration in which the processor specifies, as the core that is the migration destination, the core with the smallest processing time needed for changing the register value of the physical device when the virtual device that was operating on the one core is migrated to the other cores.

In this aspect, the processor can specify the core that is the migration destination of the virtual device which minimizes the processing time needed for changing the register value of the physical device, and can migrate the virtual device that was operating on the one core to another core.

The vehicle-mounted computer according to one aspect of the present disclosure preferably has a configuration further including a device configuration table including register values to be set in the physical device to be used by the respective plurality of virtual devices, in which the processor refers to the device configuration table and specifies, as the migration destination, the core with the smallest change amount of the register value of the physical device when the virtual device that was operating on the one core is migrated to the other cores.

In this aspect, the processor can refer to the device configuration table to specify the core that is the migration destination of the virtual device with the smallest change amount of the register value of the physical device, and can migrate the virtual device that was operating on the one core to another core.

In a vehicle-mounted computer according to one aspect of the present disclosure, the processor specifies the core that is the migration destination of the virtual device that was operating on the one core, based on information indicating the physical device to be used by the virtual device to be executed last among the virtual devices that are to operate on the other cores, and device configuration information including a register value to be set in the physical device that is to be used.

In this aspect, based on the register values set in the physical device used by the virtual device that is to be executed last, the core that is the migration destination of the virtual device that was operating on the one core can be specified with consideration given to the change amount or the change time of the register values.

The vehicle-mounted computer according to one aspect of the present disclosure preferably has a configuration in which the plurality of virtual devices have priority levels for executing processing, and the processor specifies the core that is the migration destination of the virtual device, based on the change amount from the register value of the physical device to be used by the virtual device that is to be executed last and has a higher priority level than the virtual device that was operating on the one core, among the virtual devices that are to operate on the other cores.

In this aspect, after ensuring the execution of the virtual device having a priority level greater than or equal to the priority level of the recovery target virtual device that was operating on the one core, the virtual device that was operating on the one core can be migrated to another core with consideration given to the change amount of the register value.

The vehicle-mounted computer according to one aspect of the present disclosure preferably has a configuration in which the plurality of virtual devices have priority levels for executing processing, and the processor specifies the core that is the migration destination of the virtual device, based on the processing time needed for changing the register value of the physical device to be used by the virtual device that is to be executed last and has a higher priority level than the virtual device that was operating on the one core, among the virtual devices that are to operate on the other cores.

In this aspect, after ensuring the execution of the virtual device having a priority level greater than or equal to the priority level of the recovery target virtual device that was operating on the one core, the virtual device that was operating on the one core can be migrated to another core with consideration given to the processing time needed for changing the register value.

In a vehicle-mounted computer according to one aspect of the present disclosure, the priority level is determined based on an ASIL and QM of a functional safety standard for an automobile.

In this aspect, after ensuring the execution of the virtual device having a priority level greater than or equal to the priority level of the recovery target virtual device that was operating on the one core, the virtual device that was operating on the one core can be migrated to another core with consideration given to the processing time needed for changing the register value.

The vehicle-mounted computer according to one aspect of the present disclosure preferably has a configuration in which the processor causes at least one virtual device of the plurality of virtual devices to operate periodically at a predetermined period and the other virtual devices to operate non-periodically, and, based on the change amount of the register value of the physical device to be used by the virtual device that operates periodically at a predetermined period among the virtual devices that are to operate on the other cores, specifies the core that is the migration destination of the virtual device.

In this aspect, after ensuring the execution of the virtual device that is to operate periodically at a predetermined period, the virtual device that was operating on the one core can be migrated to another core with consideration given to the change amount of the register value.

A vehicle-mounted computer according to one aspect of the present disclosure preferably has a configuration in which the processor causes at least one virtual device of the plurality of virtual devices to operate periodically at a predetermined period and the other virtual devices to operate non-periodically, and, based on the processing time needed for changing the register value of the physical device to be used by the virtual device that operates periodically at a predetermined period among the virtual devices that are to operate on the other cores, specifies the core that is the migration destination of the virtual device.

In this aspect, after ensuring the execution of the virtual device that is to operate periodically at a predetermined period, the virtual device that was operating on the one core can be migrated to another core with consideration given to the processing time needed for changing the register value.

A vehicle-mounted computer according to one aspect of the present disclosure preferably has a configuration in which the plurality of virtual devices have priority levels for executing processing, and if there are a plurality of the virtual devices that were operating on the one core, the processor preferentially migrates the virtual device with a high priority level among the plurality of virtual devices that were operating on the one core to the other cores.

In this aspect, if there are a plurality of virtual devices that were operating on one core with an abnormality, the virtual device having the highest priority level among the plurality of virtual devices operating on the one core can be preferentially migrated to another core.

A vehicle-mounted computer according to one aspect of the present disclosure preferably has a configuration in which if there are a plurality of the virtual devices that were operating on the one core, the core that is the migration destination of the virtual device is specified based on the total change amount of the register value of the physical device when migrating to the other cores.

In this aspect, if there are a plurality of virtual devices that were operating on one core with an abnormality, the core that is the migration destination of a virtual device is specified such that the total change amount of the register values of the physical device when the plurality of virtual devices operating on the one core are migrated to the other plurality of cores is minimized, and the plurality of virtual devices that were operating on the one core are migrated to the specified core that is the migration destination.

A vehicle-mounted computer according to one aspect of the present disclosure preferably has a configuration in which if there are a plurality of the virtual devices that were operating on the one core, the core that is the migration destination of the virtual device is specified based on the total processing time needed for changing the register value of the physical device when migrating to the other cores.

In this aspect, if there are a plurality of virtual devices that were operating on one core with an abnormality, the core that is the migration destination of the virtual devices is specified such that the total processing time needed for changing the register values of the physical device when the plurality of virtual devices that were operating on the one core are migrated to the other plurality of cores is minimized, and the plurality of virtual devices that were operating on the one core are migrated to the specified core that is the migration destination.

A vehicle-mounted computer according to one aspect of the present disclosure preferably has a configuration in which if the predetermined period is completed during execution of the virtual device that is to be migrated, the processor interrupts migration of the virtual device and issues an error notification.

In this aspect, if the migration of the virtual device to be migrated fails, the processing can be interrupted and notification of an error can be performed.

A computer execution method according to one aspect of the present disclosure is a computer execution method to be performed by a vehicle-mounted computer that includes a physical resource including a processor with a plurality of three or more cores and a physical device having a register, and generates a plurality of three or more virtual devices by allocating the physical resource through time-division, the method including: determining whether or not the plurality of cores are operating, specifying, if one of the cores is not operating, the core that is a migration destination of the virtual device that was operating on the one core, based on a change amount of a register value of the physical device or processing time needed for changing a register value of the physical device when the virtual device is migrated to the other cores, and migrating the virtual device that was operating on the one core to the specified core that is the migration destination.

According to this aspect, as in the case of aspect (1), it is possible to migrate the virtual device with consideration given to the change amount of the register values of the physical device or the processing time needed for changing the register values of the physical device.

A computer program according to one aspect of the present disclosure is a computer execution program for causing a vehicle-mounted computer, that includes a physical resource including a processor with a plurality of three or more cores and a physical device having a register, and generates a plurality of three or more virtual devices by allocating the physical resource through time-division, to execute: determining whether or not the plurality of cores are operating, specifying, if one of the cores is not operating, the core that is a migration destination of the virtual device that was operating on the one core, based on a change amount of a register value of the physical device or processing time needed for changing a register value of the physical device when the virtual device is migrated to the other cores, and migrating the virtual device that was operating on the one core to the specified core that is the migration destination.

According to this aspect, as in the case of aspect (1), it is possible to migrate the virtual device with consideration given to the change amount of the register values of the physical device or the processing time needed for changing the register values of the physical device.

DETAILED EMBODIMENTS OF THE DISCLOSURE

A vehicle-mounted computer, a computer execution method, and a computer program included in a vehicle-mounted system according to an embodiment of the present disclosure will be described below with reference to the drawings. Note that the present disclosure is not limited to these examples, but is indicated by the claims, and all modifications within the meaning and range of equivalency to the claims are intended to be encompassed therein. In addition, at least part of the embodiments described below may be combined as appropriate.

Figure 2:
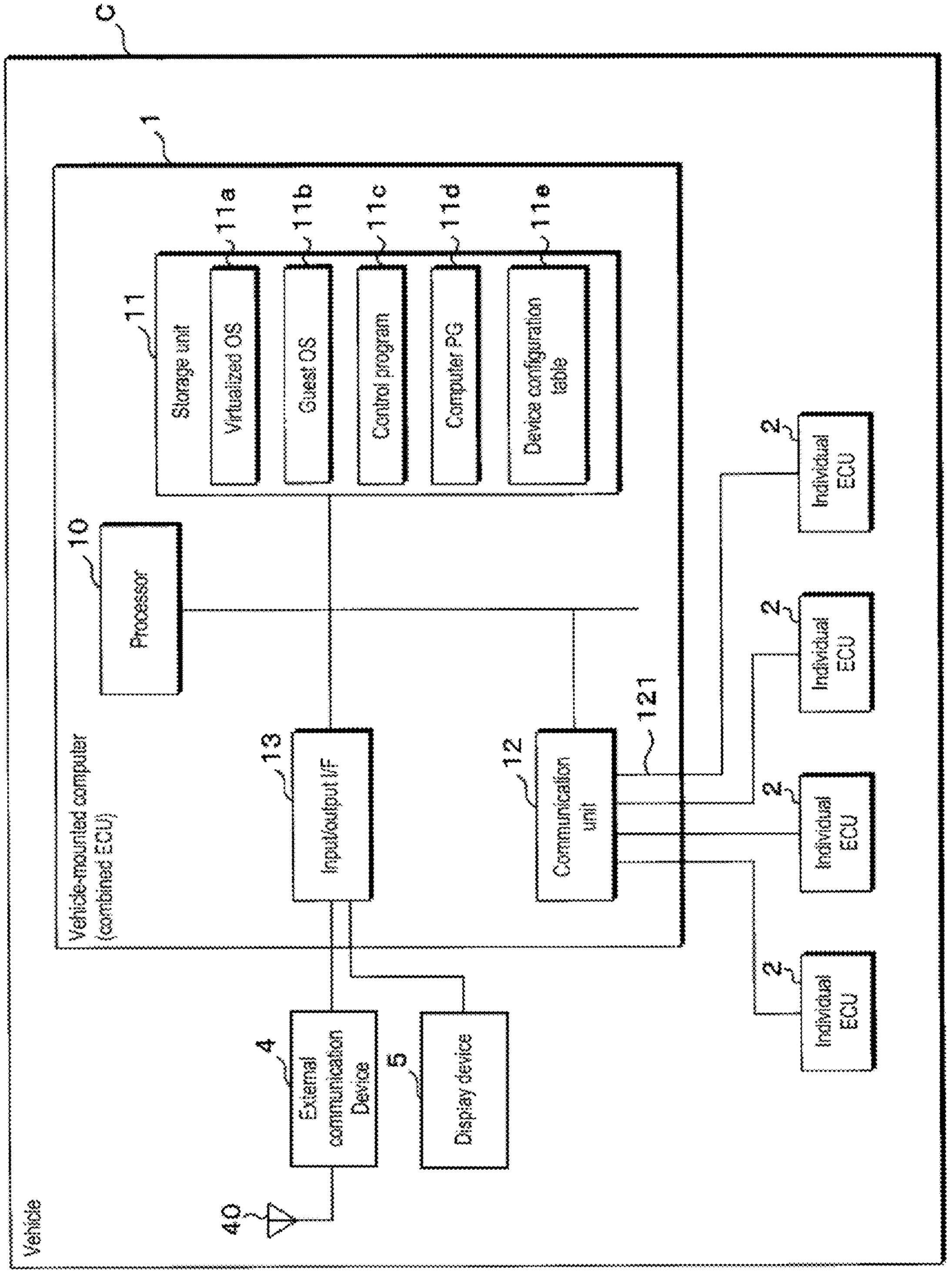
FIG. 2 is a block diagram showing a configuration example of a vehicle-mounted communication system.

Hereinafter, the present disclosure will be specifically described based on the drawings showing the embodiments thereof. FIG. 1 is a block diagram showing a network configuration of a vehicle-mounted communication system, and FIG. 2 is a block diagram showing a configuration example of the vehicle-mounted communication system.

The vehicle-mounted communication system according to the first embodiment includes a vehicle-mounted computer 1, a plurality of individual ECUs 2, devices 3 connected to the individual ECUs 2, an external communication device 4, and a display device 5. The plurality of individual ECUs 2 are respectively connected to the vehicle-mounted computer 1 via vehicle-mounted communication lines 121.

The vehicle-mounted computer 1 includes a multi-core processor 10, a storage unit 11, a communication unit 12, and an input/output I/F 13. The vehicle-mounted computer 1 is also called an integrated ECU.

The storage unit 11 is a non-volatile memory device such as flash memory or EEPROM (Electrically Erasable Programmable Read Only Memory). The storage unit 11 stores a virtualized operating system (virtualized OS) 11*a*, a guest OS lib, a control program 11*c*, a computer program (computer PG) 11*d* according to the first embodiment, a device configuration table 11*e*, and various other data necessary for the operation of the processor 10.

The virtualized operating system 11*a* is Hypervisor, for example. The virtualized operating system 11*a* has a function of constructing a plurality of virtual environments operating as virtual devices VM (see FIG. 4) on the virtualized operating system 11*a*. A virtual environment, that is, a virtual device VM includes a virtual processor, a virtual storage unit, a virtual communication unit, and the like, which are obtained by allocating physical resources including the processor 10, the storage unit 11, the communication unit 12, and the like through time-division, and operates as hardware of a virtual ECU.

The plurality of virtual devices VM have priority levels relating to execution of processing relating to the devices. The storage unit 11 stores the priority level of each virtual device VM. A virtual device VM that is responsible for processing that requires responsiveness, such as security-related processing and event-related processing, has a high priority level. A virtual device VM with a high priority level operates periodically at a predetermined period. In other words, the virtual device VM with a high priority level operates in real time.

A virtual device VM that is responsible for processing that does not require responsiveness, such as a function related to diagnosis, has a low priority level. A virtual device VM with a low priority level operates non-periodically. In other words, a virtual device VM with a low priority level operates in non-real time.

The guest OS 11*b* is an OS for operating the virtual device VM generated by the virtualized operating system 11*a*. The guest OS 11*b* is installed in a virtual device VM having virtual hardware and functions as a basic OS of the virtual device VM. The guest OS 11*b* is, for example, an AUTOSAR (registered trademark) OS, Linux (registered trademark), Android (registered trademark), QNX (registered trademark), Ubuntu (registered trademark), or the like.

The control program 11*c* is a program that runs on the guest OS 11*b* of each virtual device VM, and is for reproducing the functions of an ECU (not shown) integrated into the vehicle-mounted computer 1.

The virtual device VM reproduces the functions of a real physical ECU by causing the guest OS 11*b* and control program 11*c* to run on these pieces of virtual hardware. That is, the virtual device VM operates like an ECU connected to the vehicle-mounted communication line 121.

The computer program 11*d* is a program for, if a core of the processor 10 is not operating normally, efficiently migrating the virtual device VM that was operating on that core of the processor 10 to a core that operates normally. As an example of causing the vehicle-mounted computer to operate more stably, processing of the computer program 11*d* and the like will be described below using a case where an abnormality occurs in a core as an example. Note that the computer program 11*d* may also be incorporated in the virtualized OS 11*a*. Details of the device configuration table 11*e* will be described later.

Note that the above-described various programs may also be written in the storage unit 11 at the manufacturing stage of the vehicle-mounted computer 1, or the above-described various programs distributed from an external server device (not shown) may be acquired by the vehicle-mounted computer 1 and written in the storage unit 11. Also, the above-described various programs recorded in a computer-readable recording medium such as a memory card or an optical disk may be read out by the vehicle-mounted computer 1 and written in the storage unit 11.

As described above, the above-described various programs may also be provided in the form of distribution via a network, or may be provided in the form of being recorded on a recording medium.

The processor 10 reads out and executes the virtualized operating system 11*a*, the guest OS 11*b*, the control program 11*c*, the computer program 11*d*, the device configuration table 11*e*, and the like stored in the storage unit 11, thereby performing various arithmetic processing and implementing the computer execution method according to the first embodiment.

The communication unit 12 is, for example, an Ethernet (registered trademark) PHY unit that performs communication conforming to a communication protocol such as 100BASE-T1 or 1000BASE-T1. Note that Ethernet (registered trademark) is an example, and the communication unit 12 may be a communication circuit that performs communication with a communication protocol such as a CAN (Controller Area Network), CAN-FD, FlexRay (registered trademark), CXPI (Clock Extension Peripheral Interface), LIN (Local Interconnect Network), or the like.

A plurality of individual ECUs 2 are connected to the communication unit 12 via a vehicle-mounted communication line 121 conforming to the above-described communication protocol. An individual ECU 2 is an electronic control unit that controls the operation of the devices 3 provided in specific areas such as the front right, front left, rear right, and rear left of the vehicle C, as shown in FIG. 1, for example. The device 3 is various sensors such as a vehicle-mounted camera that captures images outside the vehicle, a LIDAR (Light Detection And Ranging), and an in-vehicle camera. The device 3 is an actuator that operates a door locking/unlocking device, a door mirror, a seat, and the like. The device 3 may also be an audio device that outputs images and audio for an entertainment system. The device 3 may also be an electronic control unit.

Control of the device 3 by the individual ECUs 2 and various arithmetic processing can be executed on the vehicle-mounted computer 1 side. That is, the vehicle-mounted computer 1 can reproduce the ECU that controls the operation of the device 3 as a virtual device VM.

The input/output I/F 13 is an interface for communicating with the external communication device 4, the display device 5, and the like. The external communication device 4 and the display device 5 are connected to the input/output I/F 13 via a wire harness such as a serial cable.

The external communication device 4 includes an antenna 40 for wireless communication, and is a communication device that performs wireless communication through an Internet communication network such as WiFi and mobile communication networks such as 3G, LTE, 4G, and 5G. The vehicle-external communication device 4 is, for example, a telematics control unit (TCU). Note that although the first embodiment describes the vehicle-external communication device 4 and the vehicle-mounted computer 1 as separate units, the vehicle-mounted computer 1 may also be configured to have the configuration and functions of the external communication device 4.

The display device 5 is, for example, an HMI (Human Machine Interface) device such as a car navigation display. The display device 5 displays data or information output from the processor 10 of the vehicle-mounted computer 1 via the input/output I/F 13.

Figure 3:
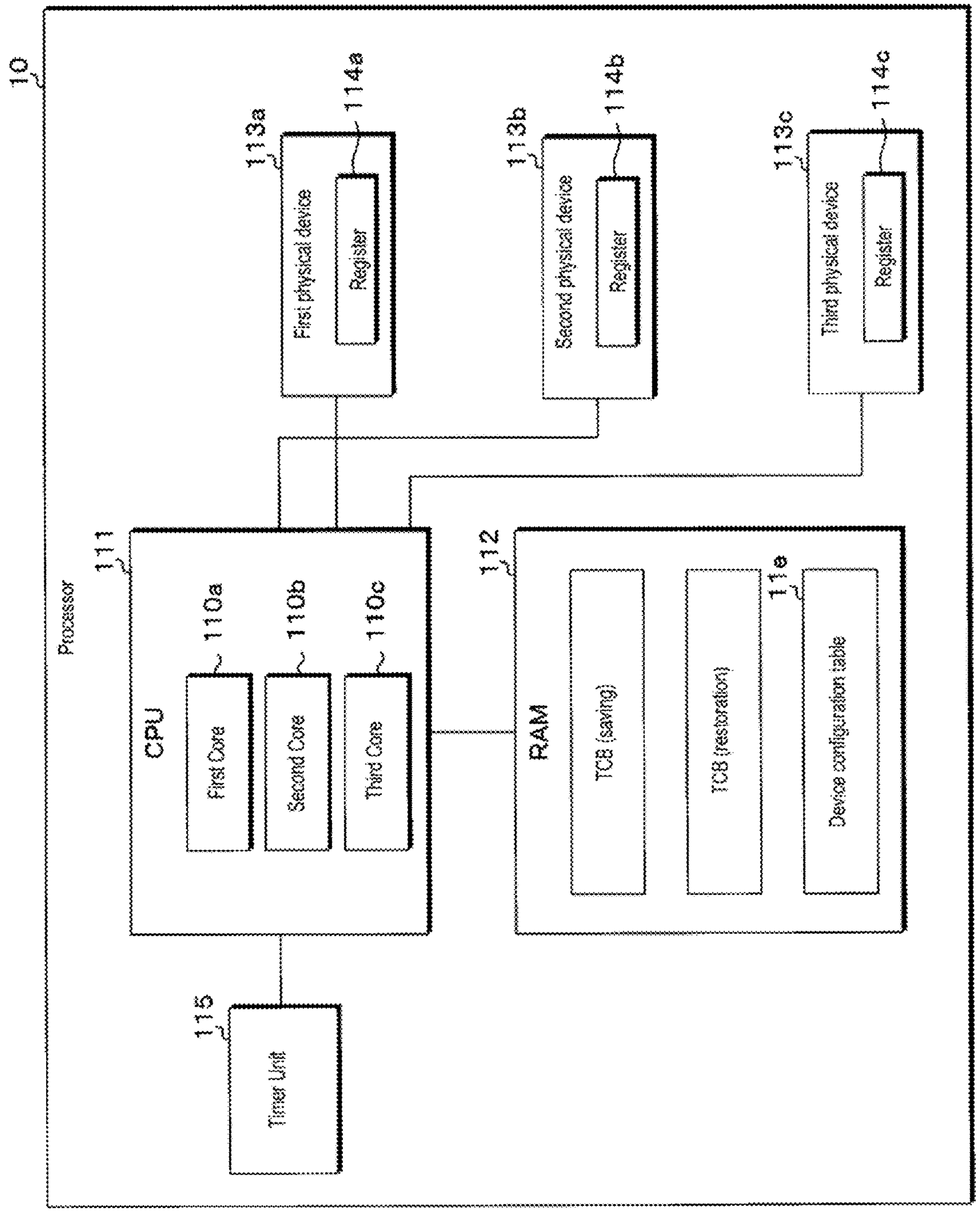
FIG. 3 is a block diagram showing a configuration example of a processor.

FIG. 3 is a block diagram showing a configuration example of the processor 10. The processor 10 includes a CPU (Central Processing Unit) 111, a RAM (Random Access Memory) 112, a first physical device 113*a*, a second physical device 113*b*, a third physical device 113*c*, and a timer unit 115, which are arithmetic units.

The CPU 111 includes, for example, a first core 110*a*, a second core 110*b*, and a third core 110*c*. Among the first to third cores 110*a*, 110*b*, and 110*c*, a core with an operational abnormality is called an abnormal core as appropriate. Among the first to third cores 110*a*, 110*b*, and 110*c*, cores that are operating normally are called normal cores as appropriate. Note that the number of cores included in the CPU 111 is not particularly limited.

The first to third physical devices 113*a*, 113*b*, and 113*c* are, for example, SCBs (System Control Blocks), MMUs (Memory Protection Units), and other peripherals. The first to third physical devices 113*a*, 113*b*, and 113*c* have at least registers 114*a*, 114*b*, and 114*c* for controlling the state of each device.

Figure 4:
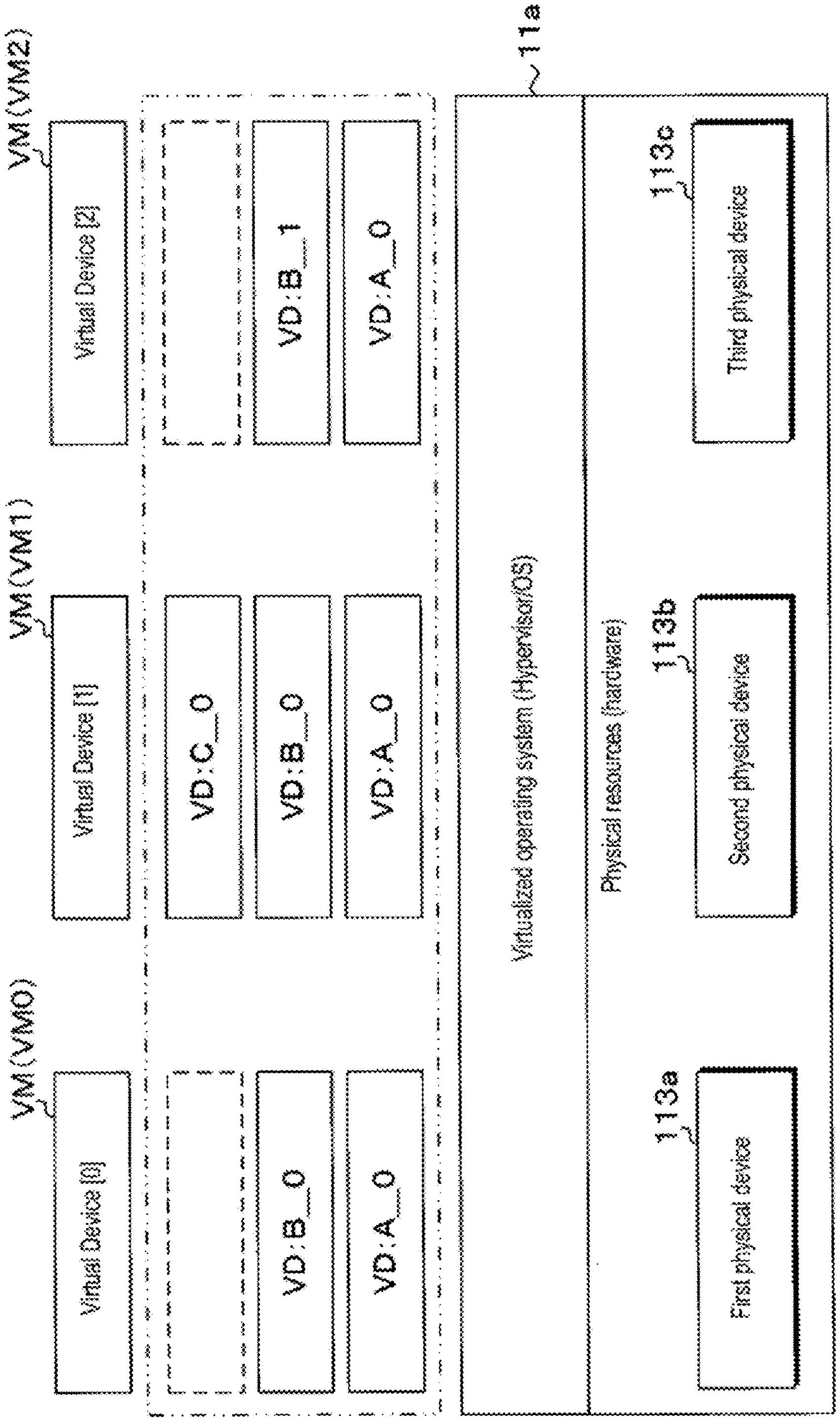
FIG. 4 is a conceptual diagram of a virtual device generated by a vehicle-mounted computer.

For convenience of drawing, FIG. 4 shows a set of first to third physical devices 113*a*, 113*b*, and 113*c* used by the first core 110*a*, for example, but the processor 10 further includes another set of first to third physical devices 113*a*, 113*b*, and 113*c* used by the second core 110*b*, and another set of first to third physical devices 113*a*, 113*b*, and 113*c* used by the third core 110*c*. That is, the processor 10 includes multiple physical devices respectively used by multiple cores.

Also, the number of physical devices provided in the processor 10 is not particularly limited.

The RAM 112 is an example of a volatile memory device. The RAM 112 of the processor 10 that generated the virtual device VM stores a TCB (Task Control Block) and a device configuration table 11*e*.

The TCB contains context information related to the virtual device VM. The context information includes the state of the CPU 111 when the virtual device VM is operating and executing the control program 11*c*, that is, the values of the registers of the CPU 111 (hereinafter referred to as the register values of the CPU 111 as appropriate). For example, the RAM 112 stores context information for two virtual devices VM before and after context switching occurs. That is, the RAM 112 stores context information saved from the registers of the CPU 111 at the time of context switching and context information to be restored to the registers of the CPU 111. More specifically, the RAM 112 stores context information for each of the first to third cores 110*a*, 110*b*, and 110*c*. Note that when the three virtual devices VM are to be operated, the RAM 112 stores the context information of the CPU 111 at the time when each virtual device VM was being controlled.

The device configuration table 11*e* will be described. The values set in the registers 114*a*, 114*b*, and 114*c* of the first to third physical devices 113*a*, 113*b*, and 113*c* when each virtual device VM operates (hereinafter referred to as the register values of the first to third physical devices 113*a*, 113*b*, and 113*c*) may be fixed or dynamically changed. The RAM 112 in FIG. 3 shows a state in which the device configuration table 11*e* stored in the storage unit 11 has been read out and stored.

FIG. 4 is a conceptual diagram of the virtual device VM generated by the vehicle-mounted computer 1, and FIG. 5 is a conceptual diagram showing an example of the device configuration table 11*e*. The virtualized operating system 11*a* creates three virtual devices VM, as shown in FIG. 4, for example. The virtual device VM uses all or some of the first to third physical devices 113*a*, 113*b*, and 113*c*. The values set in the registers 114*a*, 114*b*, and 114*c* of the first to third physical devices 113*a*, 113*b*, and 113*c* differ depending on the virtual device VM. The three blocks shown below the blocks representing the first to third physical devices 113*a*, 113*b*, and 113*c* indicate the values set in, in order starting from the bottom, the register 114*a* of the first physical device 113*a*, the register 114*b* of the second physical device 113*b*, and the register 114*c* of the third physical device 113*c*.

In FIG. 4, "VD:A_0" indicates the value "A_0" set in the register 114*a* of the first physical device 113*a*. "VD:B_0" and "VD:B_1" indicate the values "B_0" and "B_1" set in the register 114*b* of the second physical device 113*b*. "VD:C_0" indicates the value "C_0" set in the register 114*c* of the third physical device 113*c*. A blank block indicated by a dashed line indicates that the third physical device 113*c* is not used.

Note that although three virtual devices VM are illustrated in FIG. 4, the number of virtual devices VM that operate on the virtualized operating system 11*a* is not limited to three.

The device configuration table 11*e* shown in FIG. 5 is a table including a "virtual device" column, a "first physical device" column, a "second physical device" column, and a "third physical device" column. The "virtual device" column stores identification data VM[0], VM[1], VM[2], . . . for identifying each of a plurality of virtual devices VM. Hereinafter, the virtual device VM indicated by the identification data VM[0] is referred to as a virtual device VM0, the virtual device VM indicated by the identification data VM[1] is referred to as a virtual device VM1, and the virtual device VM indicated by the identification data VM[2] is referred to as a virtual device VM2.

The "first physical device" column stores whether or not the corresponding virtual device VM uses the first physical device 113*a*, and if so, the value set in the register 114*a*. In the example shown in FIG. 5, all of the virtual devices VM use the first physical device 113*a*, and the value set in the register 114*a* is the same "A_0".

The "second physical device" column stores whether or not the corresponding virtual device VM uses the second physical device 113*b*, and if so, the value set in the register 114*b*. In the example shown in FIG. 5, all of the virtual devices VM use the second physical device 113*b*, the values set in the registers 114*a* and 114*b* of the virtual devices VM0 and VM1 are "B_0", and the value set in the register 114*c* of the virtual device VM2 is "B_1".

The "third physical device" column stores whether or not the corresponding virtual device VM uses the third physical device 113*c*, and if so, the value set in the register 114*c*. In the example shown in FIG. 5, one virtual device VM2 uses the third physical device 113*c*, and the value set in the register 114*c* of the virtual device VM2 is "C_0". "Not applicable" indicates that the third physical device 113*c* is not used.

FIGS. 6A and 6B are conceptual diagrams showing an example of setting values of the second physical device 113*b*. FIG. 6A shows the value "B_0" set in the register 114*b* of the second physical device 113*b*, and FIG. 6B shows the value "B_1" set in the register 114*b* of the second physical device 113*b*. "Identifier (address)" indicates the address of the register 114*b*, and "setting value" is the numerical value set in the register 114*b* specified by each address.

Figure 7:
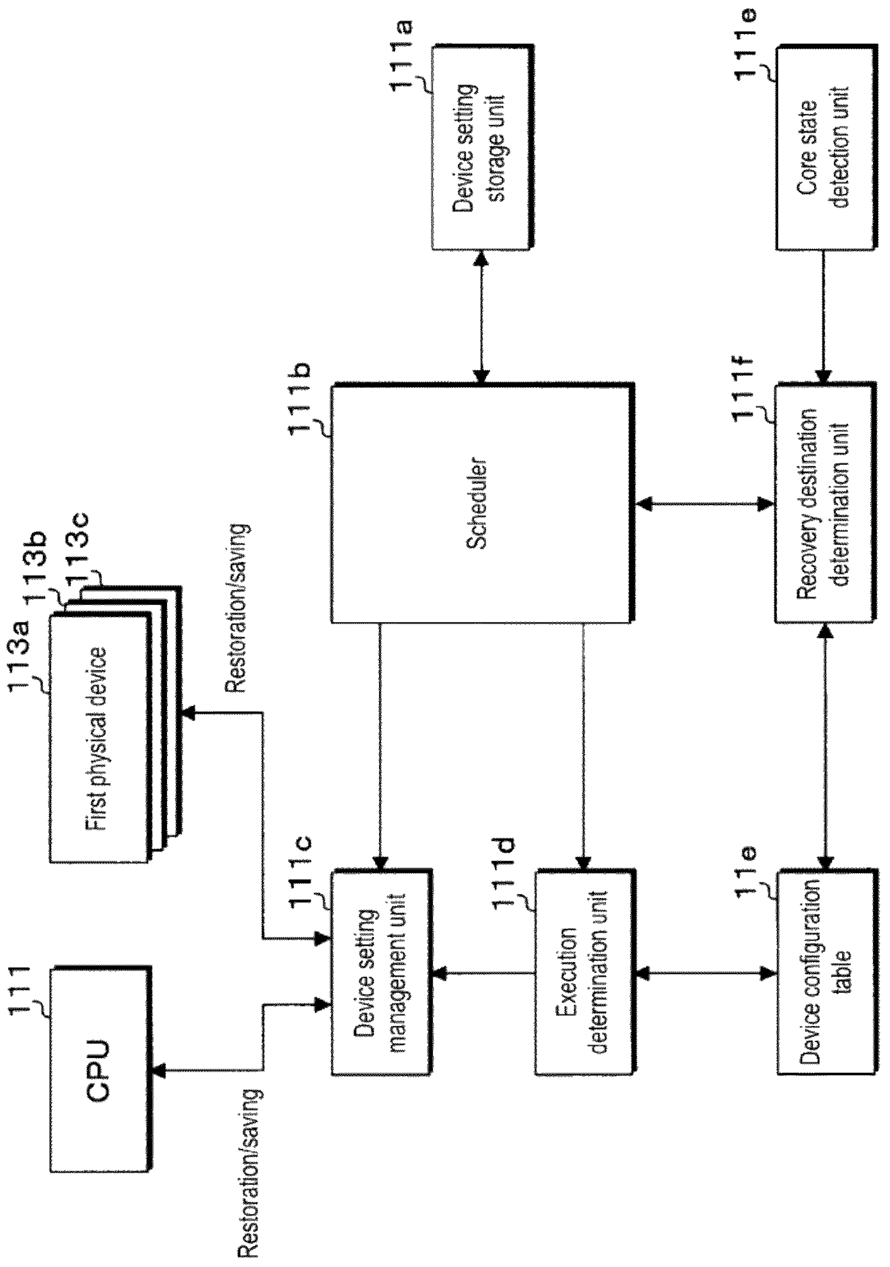
FIG. 7 is a functional block diagram relating to context switching and migration processing of a first embodiment.

FIG. 7 is a functional block diagram related to context switching and migration processing according to the first embodiment. The vehicle-mounted computer 1 includes a device setting storage unit 111*a*, a scheduler 111*b*, a device setting management unit 111*c*, an execution determination unit 111*d*, a core state detection unit 111*e*, and a recovery destination determination unit 111*f* as functional units.

The device setting storage unit 111*a* is a functional unit that stores a TCB or context information. The device setting storage unit 111*a* stores the register values of the CPU 111 related to the virtual devices VM, and more specifically, the register values of the first and second cores 110*a* and 110*b* related to a plurality of virtual devices VM as context information. More specifically, when switching the virtual device VM to be operated by the CPU 111, the device setting storage unit 111*a* saves the value of the register of the first core 110*a* that was controlling the operating virtual device VM, and stores the value as context information. Similarly, the values of the registers of the second core 110*b* and the third core 110*c* that were controlling the operating virtual device VM are saved and stored as context information.

In response to an inquiry from the scheduler 111*b*, the device setting storage unit 111*a* returns the context information stored in the device setting storage unit 111*a*, that is, the register values of the CPU 111 related to the virtual device VM to be operated next due to the context switching. The RAM 112 is the main hardware that constitutes the device setting storage unit 111*a*.

The scheduler 111*b* is a functional unit that manages allocation and switching of hardware resources of the CPU 111 to the virtual devices VM. In other words, the scheduler 111*b* is a functional unit that manages the order in which a plurality of virtual devices VM are allocated to the first to third cores 110*a*, 110*b*, and 110*c*, subjected to context switching, and executed.

The first to third cores 110*a*, 110*b*, and 110*c* execute processing related to each allocated virtual device VM. The processing related to the virtual device VM includes processing for emulating a virtual processor, a virtual storage unit, a virtual communication unit, and the like constituting the virtual device VM, processing for causing the guest OS 11*b* and the control program 11*c* to run, and the like.

The scheduler 111*b* switches the virtual devices VM such that the processing related to the virtual device VM requiring responsiveness is periodically executed at a predetermined period. A virtual device VM that requires responsiveness is, for example, a device that handles functions or data corresponding to an ASIL (Automotive Safety Integrity Level) or QM (Quality Management) based on automotive functional safety standards (ISO26262).

On the other hand, the scheduler 111*b* switches the virtual devices VM such that the processing related to virtual devices VM that do not require responsiveness are executed non-periodically by the first to third cores 110*a*, 110*b*, and 110*c*, which have sufficient processing capacity. That is, after the first to third cores 110*a*, 110*b*, and 110*c* cause the virtual devices VM that require responsiveness to operate, if there is room to operate another virtual device VM, the first to third cores 110*a*, 110*b*, and 110*c* cause the virtual devices VM that do not require responsiveness to operate. A virtual device VM that does not require responsiveness is, for example, a device that handles functions or data corresponding to the QM (Quality Management) level based on automotive functional safety standards.

Figure 8:
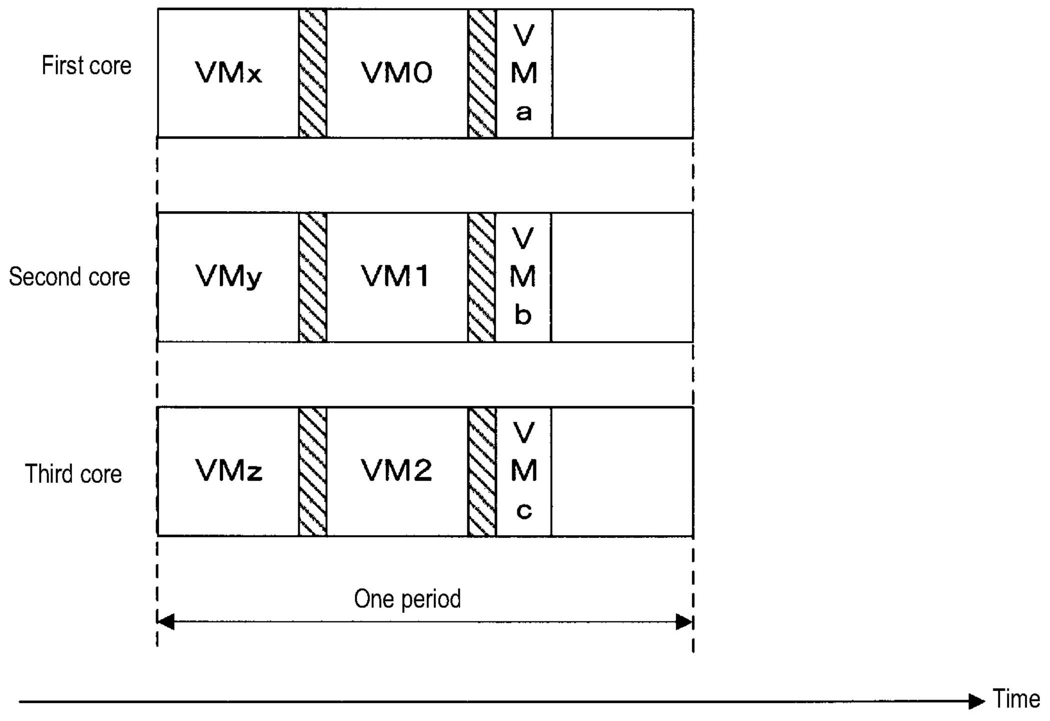
FIG. 8 is an explanatory diagram showing a state in which physical resources of first to third cores are time-divided and allocated to a plurality of virtual devices.

FIG. 8 is an explanatory diagram showing a state in which the physical resources of the first to third cores 110*a*, 110*b*, and 110*c* are time-divided and allocated to a plurality of virtual devices VM. Horizontal arrows indicate the flow of time. VMx, VMy, VMz, VM0, VM1, and VM2 indicate virtual devices VM that are allocated to the first to third cores 110*a*, 110*b*, and 110*c* and require responsiveness, and it is indicated that the processing for the devices is to be executed periodically each predetermined period. The first core 110*a* executes processing related to two virtual devices VM indicated by VMx and VM0 each predetermined period. The second core 110*b* executes processing related to the two virtual devices VM indicated by VMy and VM1 each predetermined period. The third core 110*c* executes processing related to the two virtual devices VM indicated by VMz and VM2 each predetermined period.

The hatched portions indicate processing related to context switching of the virtual devices VM and setting change of the register values of the first to third physical devices 113*a*, 113*b*, and 113*c*.

VMa, VMb, and VMc are virtual devices VM that do not require responsiveness and are allocated non-periodically to the first to third cores 110*a*, 110*b*, and 110*c* that have spare capacity to execute processing. In FIG. 8, the first to third cores 110*a*, 110*b*, and 110*c* have spare capacity to execute other processing after completing the processing related to the virtual devices VM indicated by VMx, VMy, VMz, VM0, VM1, and VM2, and therefore the first to third cores 110*a*, 110*b*, and 110*c* execute processing related to the virtual devices VM indicated by VMa, VMb, and VMc.

Hereinafter, the information indicating the virtual device VM before the context switching, that is, the operating virtual device VM, is referred to as first virtual device information, and the information indicating the virtual device VM after the context switching, that is, the virtual device VM to be operated next, is referred to as second virtual device information.

The scheduler 111*b* provides the first virtual device information and the second virtual device information related to the first to third cores 110*a*, 110*b*, and 110*c* to the execution determination unit 111*d*. Also, the scheduler 111*b* uses the second virtual device information related to the first to third cores 110*a*, 110*b*, and 110*c* to inquire about the context information of the virtual device VM indicated by the second virtual device information, and acquires the context information output from the device setting storage unit 111*a*. The scheduler 111*b* provides the acquired context information to the device setting management unit 111*c*.

Note that the CPU 111 and the timer unit 115 are the main hardware constituting the scheduler 111*b*.

The execution determination unit 111*d* acquires the first virtual device information and the second virtual device information provided from the scheduler 111*b*, refers to the device configuration table 11*e* based on the acquired first and second virtual device information, and reads out the set values of the registers 114*a*, 114*b*, and 114*c* of the first to third physical devices 113*a*, 113*b*, and 113*c* associated with the virtual devices VM before and after context switching, which are related to the third cores 110*a*, 110*b*, and 110*c*. Then, when switching the virtual devices VM of the first to third cores 110*a*, 110*b*, and 110*c*, the execution determination unit 111*d* determines whether or not the setting values of the registers 114*a*, 114*b*, and 114*c* of the first to third physical devices 113*a*, 113*b*, and 113*c* need to be changed, and provides the device information based on the determination result to the device setting manager.

If it is determined that there is no need to change the setting values of the registers 114*a*, 114*b*, and 114*c* of the first to third physical devices 113*a*, 113*b*, and 113*c*, the device information includes information indicating that setting change is unnecessary. If it is determined that the setting values of the registers 114*a*, 114*b*, and 114*c* of the first to third physical devices 113*a*, 113*b*, and 113*c* need to be changed, the device information includes identifiers and setting values for the registers 114*a*, 114*b*, and 114*c* of the first to third physical devices 113*a*, 113*b*, and 113*c* for which a change of setting values is needed. Note that the CPU 111 is the main hardware that constitutes the execution determination unit 111*d*.

The device setting management unit 111*c* acquires the context information provided from the scheduler 111*b*, saves the register values of the CPU 111, that is, the first to third cores 110*a*, 110*b*, and 110*c*, and restores the acquired context information. That is, the device setting management unit 111*c* stores the register values of the first to third cores 110*a*, 110*b*, and 110*c* before the context switching in the device setting storage unit 111*a* as context information of the first to third cores 110*a*, 110*b*, and 110*c* related to the operating virtual device VM, and then sets the context information acquired from the scheduler 111*b*, that is, the register values of the first to third cores 110*a*, 110*b*, and 110*c* related to the virtual device VM after the context switching, in the registers of the first to third cores 110*a*, 110*b*, and 110*c*.

The device setting management unit 111*c* acquires the device information provided from the execution determination unit 111*d*, and if the acquired device information indicates that the setting change is unnecessary, the device setting management unit 111*c* ends the processing related to context switching without performing a setting change of the registers 114*a*, 114*b*, and 114*c* of the first to third physical devices 113*a*, 113*b*, and 113*c*. The CPU 111 immediately starts executing the processing related to the virtual device VM after the context switching without rewriting the registers 114*a*, 114*b*, and 114*c* of the first to third physical devices 113*a*, 113*b*, and 113*c*.

On the other hand, if the acquired device information indicates the identifiers and setting values of the registers 114*a*, 114*b*, and 114*c* of the specific first to third physical devices 113*a*, 113*b*, and 113*c* for which a setting change is needed, the device setting management unit 111*c* changes the setting values of the registers 114*a*, 114*b*, and 114*c* of the first to third physical devices 113*a*, 113*b*, and 113*c* using the identifiers and setting values. The CPU 111 rewrites the registers of the CPU 111 and the registers 114*a*, 114*b*, and 114*c* of the specific first to third physical devices 113*a*, 113*b*, and 113*c* for which a setting change is needed, and starts executing the processing related to the virtual device VM after the context switching.

The device setting management unit 111*c* executes processing related to changing the register values of the first to third physical devices 113*a*, 113*b* and 113*c* for each of the first to third cores 110*a*, 110*b*, and 110*c*.

Note that the CPU 111 is the main hardware that constitutes the device setting management unit 111*c*.

The core state detection unit 111*e* is a functional unit that monitors the states of the first to third cores 110*a*, 110*b*, and 110*c* of the processor 10 and detects an abnormality or the like in the first to third cores 110*a*, 110*b*, and 110*c*. For example, the virtualized operating system 11*a* can monitor the operating states of the first to third cores 110*a*, 110*b*, and 110*c* and detect abnormalities. The CPU 111 need only detect abnormalities in the first to third cores 110*a*, 110*b*, and 110*c* using the functions of the virtualized operating system 11*a*. If the core state detection unit 111*e* detects an abnormality in the first to third cores 110*a*, 110*b*, and 110*c*, the core state detection unit 111*e* provides abnormality information indicating the abnormal core to the recovery destination determination unit 111*f*.

Note that the CPU 111 is the main hardware that constitutes the core state detection unit 111*e*.

The recovery destination determination unit 111*f* is a functional unit that, if abnormality information output from the core state detection unit 111*e* is acquired, determines the core that is the migration destination of the virtual device VM that was operating on the abnormal core. The recovery destination determination unit 111*f* considers the processing load for changing the register values of the first to third physical devices 113*a*, 113*b*, and 113*c* accompanying the migration of the virtual device VM, and determines the core among the first to third cores 110*a*, 110*b*, and 110*c* that has the smallest processing load as the migration destination. That is, the recovery destination determination unit 111*f* determines the core that has the smallest change amount of the register values of the first to third physical devices 113*a*, 113*b*, and 113*c* accompanying the migration of the virtual device VM, or the core that has the smallest processing time needed for changing the register values as the migration destination. The recovery destination determining unit 111*f* outputs information indicating the abnormal core and the migration destination core to the scheduler 111*b*. The scheduler 111*b* acquires the information output from the recovery destination determination unit 111*f*, and changes the schedule of tasks related to the virtual device VM such that the virtual device VM that was being executed in the abnormal core operates on the first to third cores 110*a*, 110*b*, and 110*c* determined by the recovery destination determination unit 111*f*.

As described above, according to the device setting storage unit 111*a*, the scheduler 111*b*, the device setting management unit 111*c*, the execution determination unit 111*d*, the core state detection unit 111*e*, and the recovery destination determination unit 111*f*, if an abnormality in the first to third cores 110*a*, 110*b*, and 110*c* is detected, when a virtual device VM operating on the abnormal core is to be migrated to the other first to third cores 110*a*, 110*b*, and 110*c* that are operating normally, the core that is the migration destination can be determined so as to minimize the change amount of the register values of the first to third physical devices 113*a*, 113*b*, and 113*c* or the processing time needed for changing. Then, the virtual device VM can be efficiently recovered.

Figure 9:
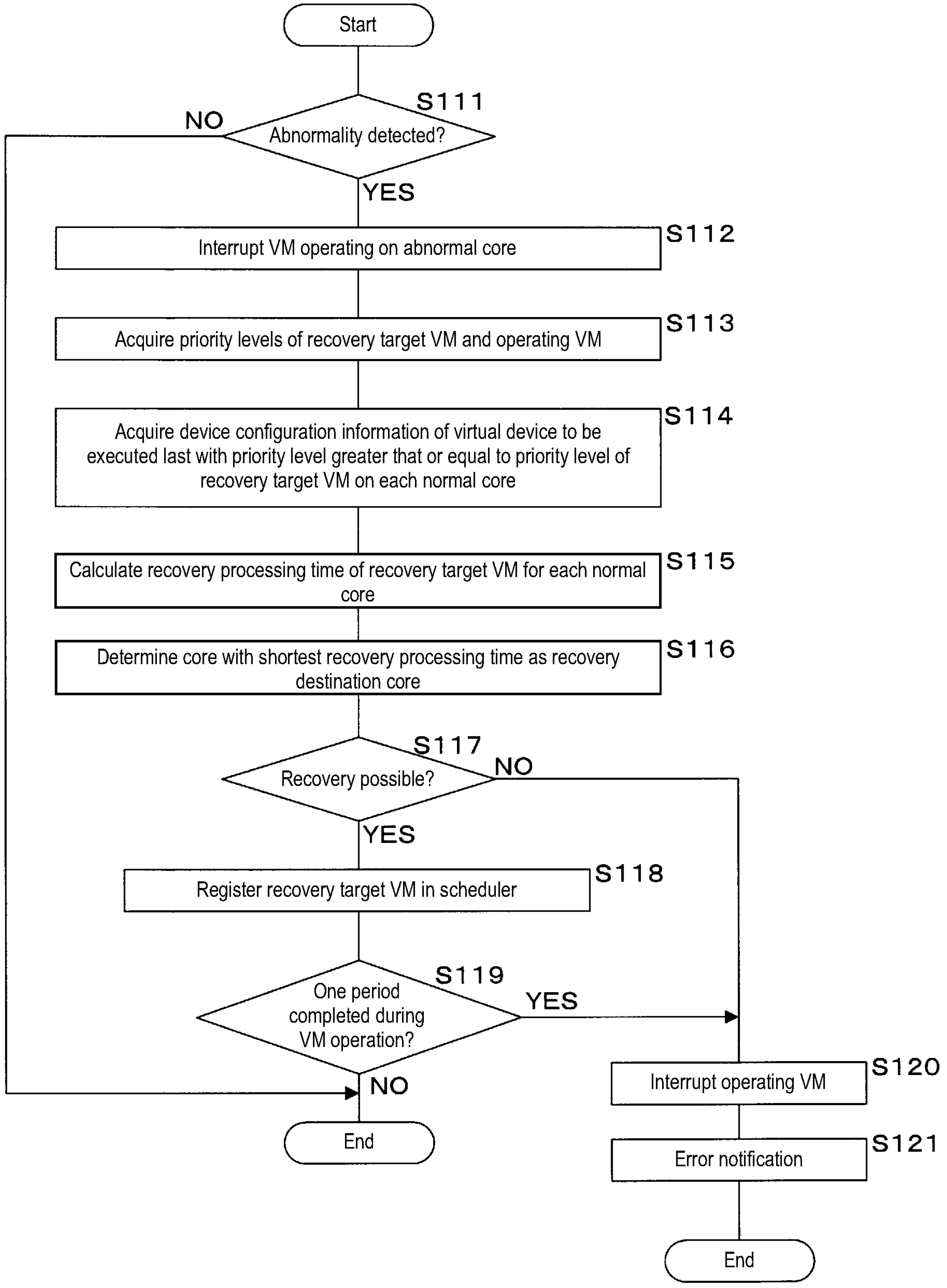
FIG. 9 is a flow chart showing a migration processing procedure according to the first embodiment.

FIG. 9 is a flow chart showing the migration processing procedure of the first embodiment. The processor 10 monitors the states of the first to third cores 110*a*, 110*b*, and 110*c* and determines whether or not the first to third cores 110*a*, 110*b*, and 110*c* are abnormal (step S111). If it is determined that none of the first to third cores 110*a*, 110*b*, and 110*c* are abnormal (step S111: NO), that is, if all of the first to third cores 110*a*, 110*b*, and 110*c* are operating normally, the processor 10 ends the processing.

If it is determined that any one of the first to third cores 110*a*, 110*b*, and 110*c* is abnormal (step S111: YES), the processor 10 interrupts the processing related to the virtual device VM that was operating on the abnormal core (step S112). Hereinafter, a virtual device VM that was operating on the abnormal core is called a recovery target virtual device (recovery target VM in the drawing), and a virtual device VM that is operating on another normal core is called an operating virtual device (operating VM in the drawing). A recovery target virtual device is a virtual device VM that requires responsiveness, such as a device that handles functions or data corresponding to ASIL based on automotive functional safety standards.

Next, the processor 10 acquires the priority levels of the recovery target virtual device and the operating virtual devices from the storage unit 11 (step S113). Then, the processor 10 refers to the device configuration table 11*e* and acquires the device configuration information of the virtual device VM to be executed last among the virtual devices VM having a priority level greater than or equal to the priority level of the recovery target virtual device in each normal core (step S114). The device configuration information includes information indicating the physical device used by the virtual device VM to be executed last and setting values set for the used physical device.

Next, the processor 10 calculates the recovery processing time of the recovery target virtual device for each normal core, based on the device configuration information acquired in step S114 and the device configuration information of the recovery target virtual device (step S115). The processor 10 need only calculate, for example, the number of registers 114*a*, 114*b*, and 114*c* of the first to third physical devices 113*a*, 113*b*, and 113*c* for which a setting change is needed, that is, the change amount, as the recovery processing time. Also, the processing time needed for changing the settings of the register values of the first to third physical devices 113*a*, 113*b*, and 113*c* may be stored in the storage unit 11, and the processor 10 may calculate the recovery processing time by adding the processing times of the first to third physical devices 113*a*, 113*b*, and 113*c* for which a setting change is needed.

Then, the processor 10 determines the normal core with the shortest recovery processing time as the recovery destination core, which is the migration destination (step S116).

Next, the processor 10 determines whether or not it is possible to recover the recovery target virtual device in the recovery destination core (step S117). Specifically, the processor 10 determines whether or not it is possible to execute the processing related to the recovery target virtual device before the predetermined period ends. If it is determined that recovery is possible (step S117: YES), the recovery target virtual device is registered in the scheduler 111*b* (step S118). That is, the processor 10 changes the execution schedule of the processing related to the virtual device VM such that the recovery destination core determined in step S116 executes the processing related to the recovery target virtual device.

Next, the processor 10 determines whether or not one period (predetermined period) has been completed during execution of the recovery target virtual device (step S119). If it is determined that one period (predetermined period) has not been completed during execution of the recovery target virtual device (step S119: NO), or in other words, if the processing related to the recovery target virtual device has been completed without any problem before one period is completed, the processor 10 ends processing.

If it is determined in step S117 that recovery is not possible (step S117: NO), and if it is determined in step S119 that one period (predetermined period) has been completed during execution of the recovery target virtual device (step S119: YES), the processor 10 interrupts recovery of the recovery target virtual device (step S120), issues an error notification (step S121), and ends the processing.

Figure 10A:
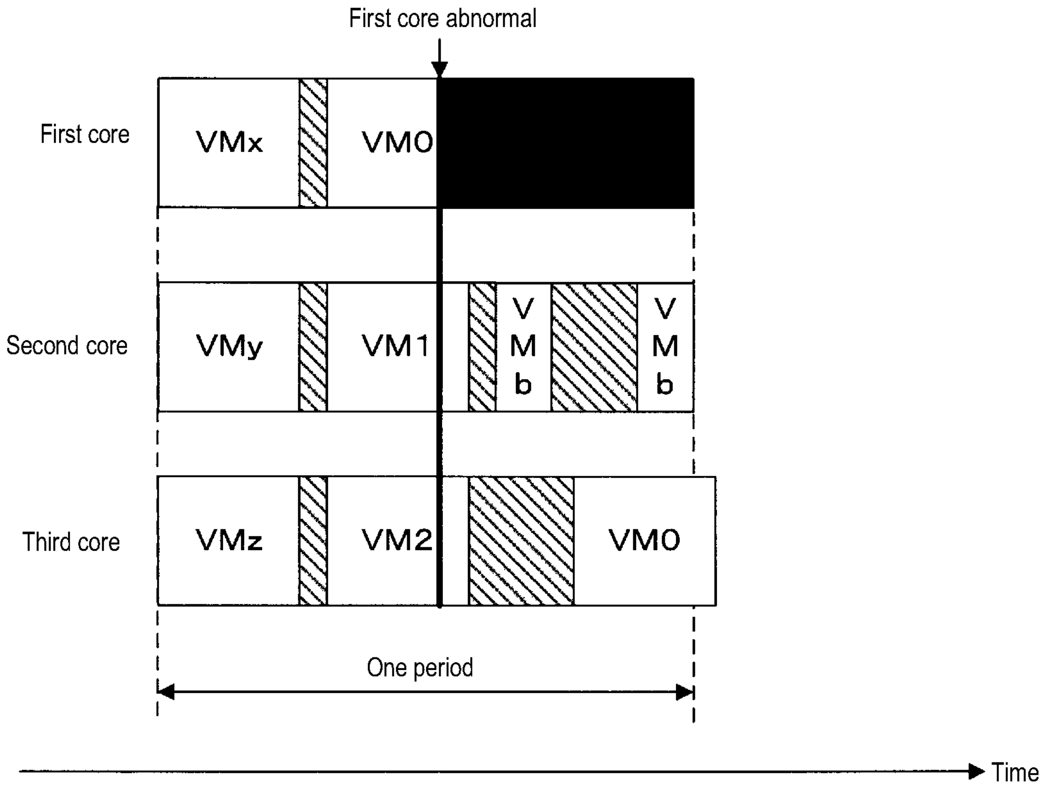
FIG. 10A is an explanatory diagram showing a migration method of migrating a virtual device from an abnormal core to a normal core.
Figure 10B:
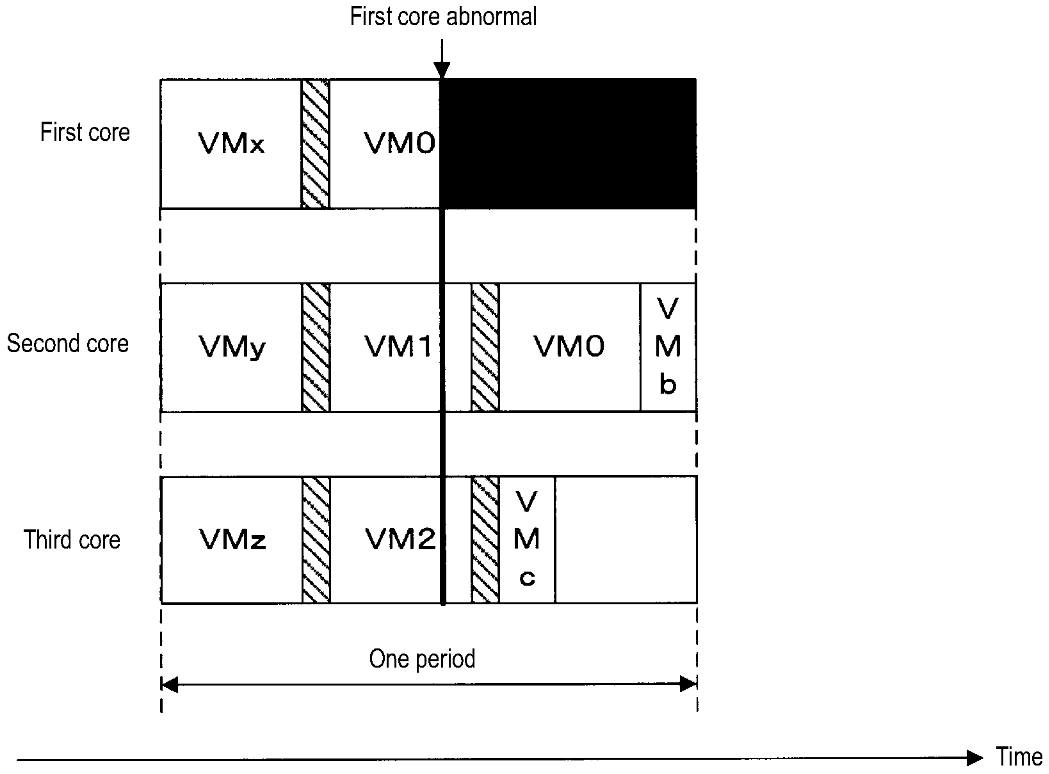
FIG. 10B is an explanatory diagram showing a migration method of migrating a virtual device from an abnormal core to a normal core.
Figure 11:
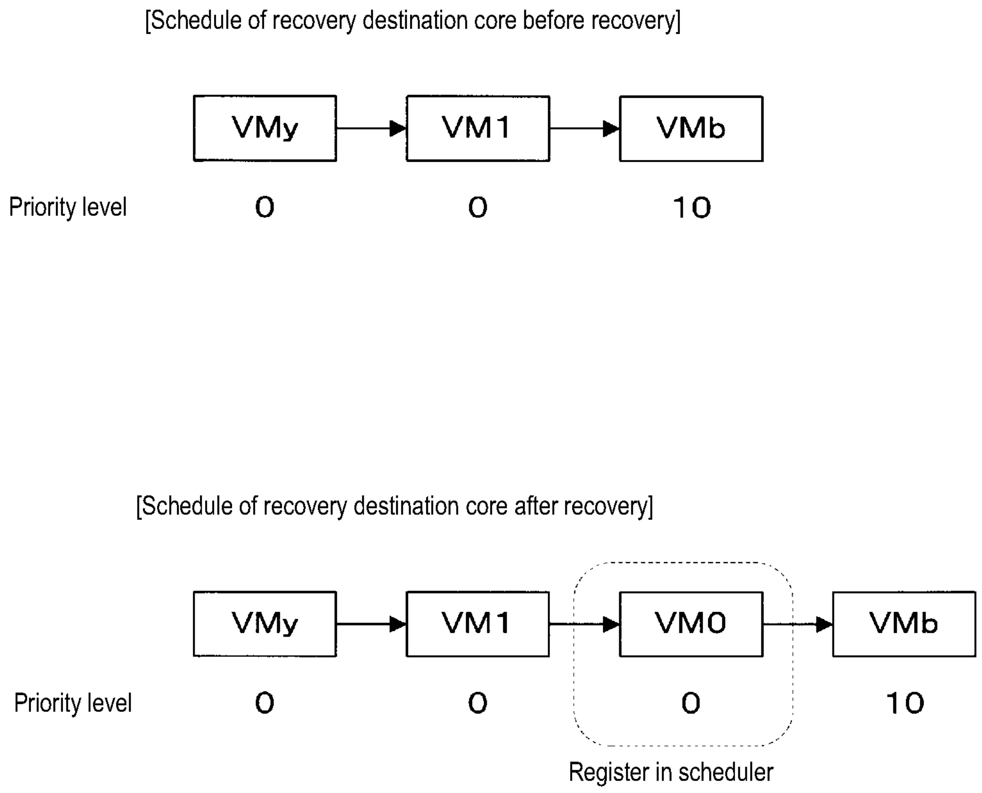
FIG. 11 is a conceptual diagram showing changing of a processing execution schedule according to a virtual device.

FIGS. 10A and 10B are explanatory diagrams showing a method for migrating a virtual device from an abnormal core to a normal core, and FIG. 11 is a conceptual diagram showing changing of an execution schedule of processing related to the virtual device VM. FIG. 10A shows the state when the restoration target virtual device indicated by VM0 that was being executed on the first core 110*a* is allocated to the third core 110*c* if the first core 110*a* becomes abnormal at the timing indicated by the thick line. FIG. 10B shows the state when the restoration target virtual device indicated by VM0 that was being executed on the first core 110*a* is allocated to the second core 110*b* if the first core 110*a* becomes abnormal at the timing indicated by the thick line.

As shown in FIGS. 10A and 10B, it is indicated that if the restoration target virtual device is migrated to the third core 110*c*, the processing load for changing the setting of the register values of the first to third physical devices 113*a*, 113*b*, and 113*c* is large, and if the recovery target virtual device is migrated to the second core 110*b*, the processing load for changing the setting of the register values of the first to third physical devices 113*a*, 113*b*, and 113*c* is small. Also, as shown in FIG. 10A, it is indicated that if the recovery target virtual device is migrated to the third core 110*c*, the processing related to the recovery target virtual device cannot be completed before one period is completed.

In such a case, the processor 10 migrates the restoration target virtual device to the second core 110*b* and changes the execution schedule of the virtual devices VM, as shown in FIGS. 10B and 11. More specifically, the processor 10 schedules and registers the recovery target virtual device VM0 between the virtual devices VMy and VM1 that have high priority levels and are executed by the second core 110*b* and the other virtual device VMb that has a low priority level.

As described above, according to the vehicle-mounted computer 1, the computer execution method, and the computer program 11*d* according to the first embodiment, when any one of the first to third cores 110*a*, 110*b*, and 110*c* of the processor 10 becomes abnormal and the recovery target virtual device that was operating on the abnormal core is to be migrated to any of the other normal cores, it is possible to efficiently migrate the virtual device VM such that the processing load for a setting change of the register values of the physical device, the setting change processing time, or the change amount of the register is minimized.

Specifically, the processor 10 can determine the core that is the migration destination of the virtual device VM for which the change amount of the register values of the first to third physical devices 113*a*, 113*b*, and 113*c* or the processing time required to change the register values of the first to third physical devices 113*a*, 113*b*, and 113*c*, and can migrate the virtual device VM that was operating on the abnormal core to the normal core.

Also, by referring to the device configuration table 11*e*, the processor 10 can specify the core that is the migration destination of the virtual device VM for which the change amount of the register values of the first to third physical devices 113*a*, 113*b*, and 113*c* is minimized, and can migrate the virtual device VM that was operating on the abnormal core to the normal core.

Furthermore, the processor 10 can ensure the execution of the virtual device VM having a priority level greater than or equal to the priority level of the recovery target virtual device VM that was operating on the abnormal core, and then migrate the virtual device VM that was operating on the abnormal core to a normal core.

Furthermore, the processor 10 can ensure execution of the virtual device VM that is to operate periodically at a predetermined period, and then migrate the virtual device VM that was operating on the abnormal core to the normal core.

Note that in the first embodiment, an example in which a virtual environment is constructed using the Hypervisor-type virtualized operating system 11*a* has been described, but the virtual environment may also be constructed using host OS-type virtualized software, that is, virtualized software that runs on a basic OS.

Second Embodiment

The vehicle-mounted computer 1, the computer execution method, and the computer program 11*d* according to the second embodiment differ from the first embodiment in the migration processing procedure considering the case where there are a plurality of recovery target virtual devices. Other configurations of the vehicle-mounted computer 1 and the like are the same as those of the vehicle-mounted computer 1 and the like according to the first embodiment, and therefore the same locations are denoted by the same reference signs and detailed description thereof is omitted.

Figure 12:
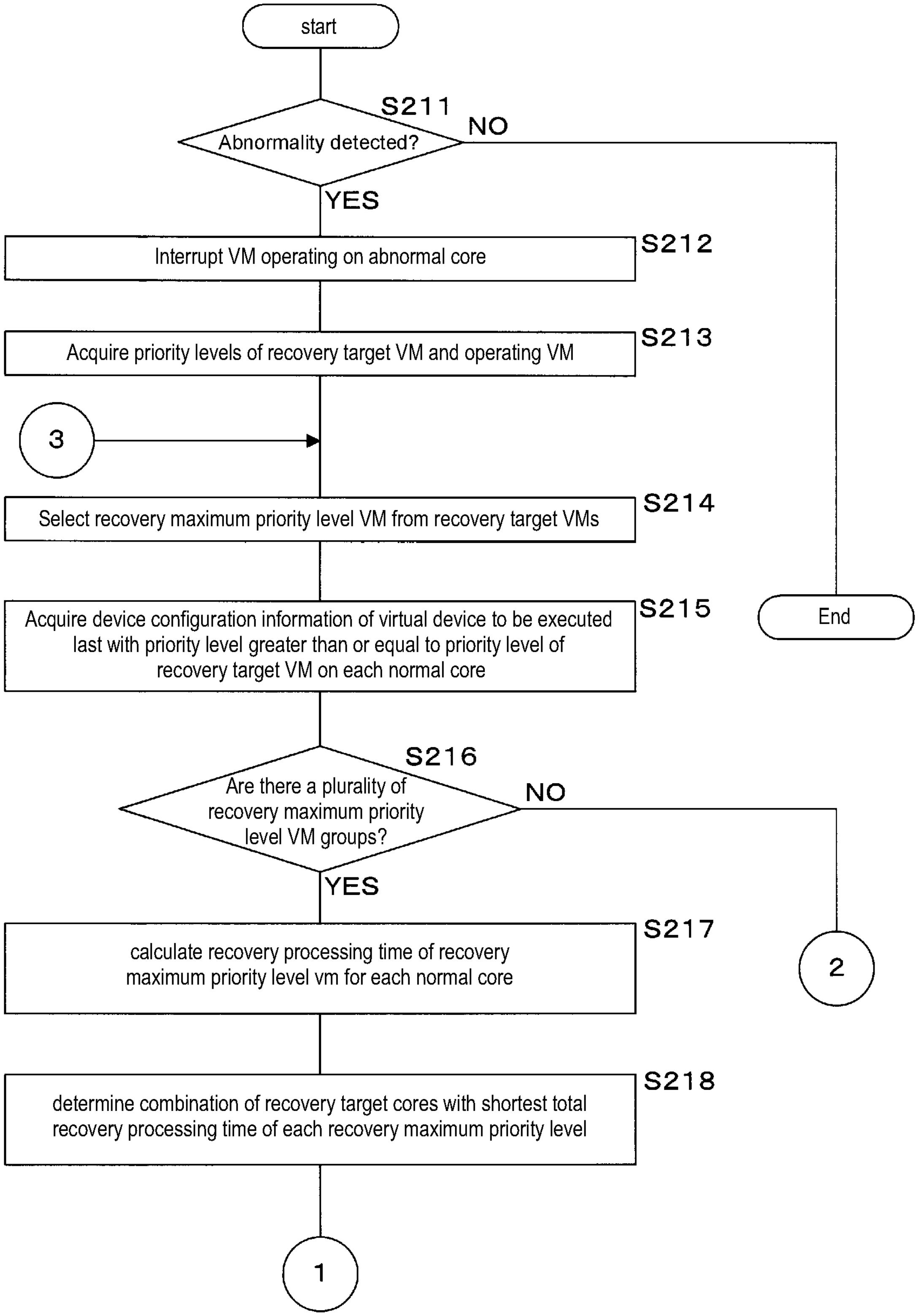
FIG. 12 is a flow chart showing a migration processing procedure according to a second embodiment.
Figure 13:
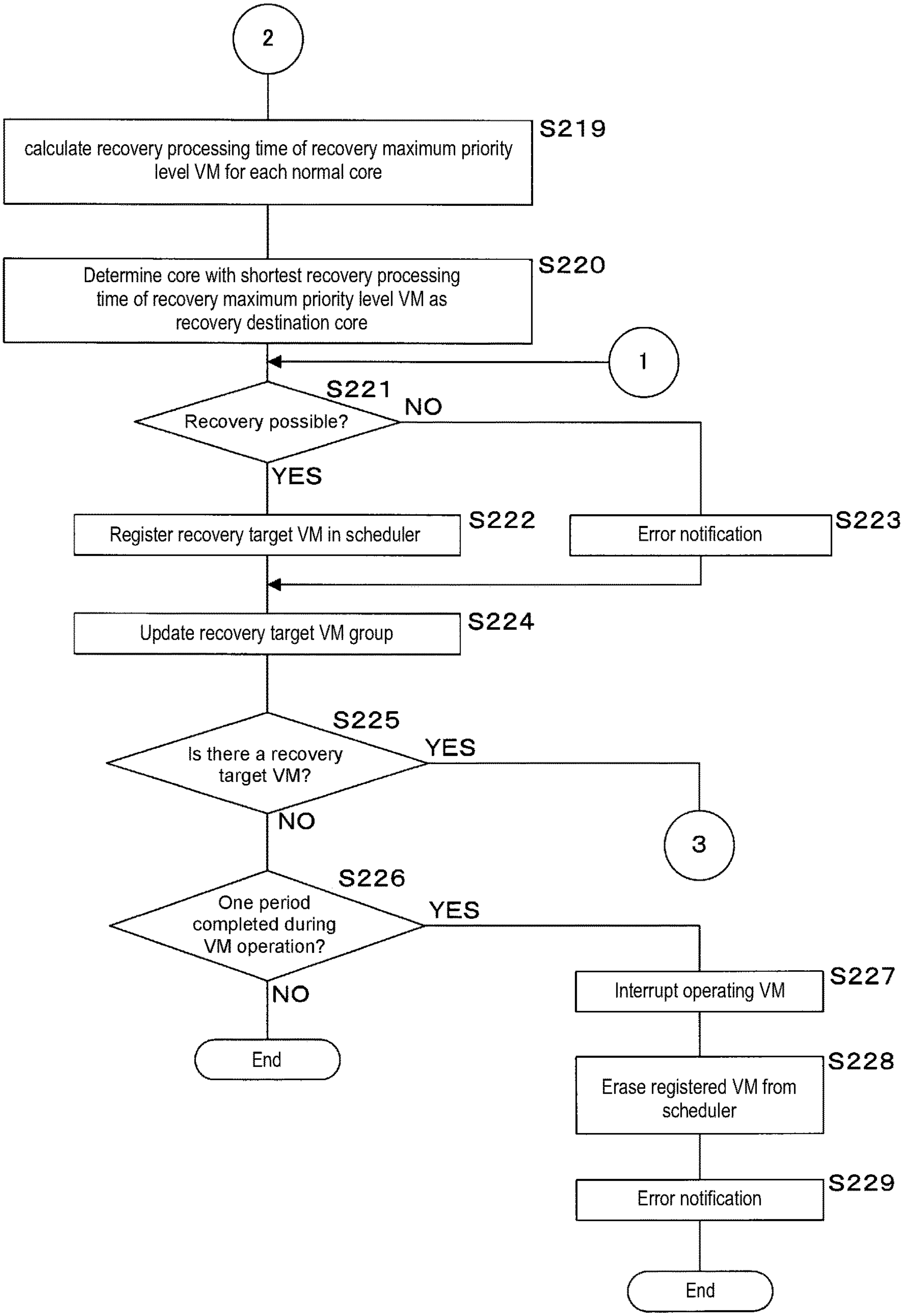
FIG. 13 is a flow chart showing a migration processing procedure according to the second embodiment.

FIGS. 12 and 13 are flowcharts showing a migration processing procedure according to the second embodiment. Similarly to steps S111 and S112 of the first embodiment, the processor 10 monitors the states of the first to third cores 110*a*, 110*b*, and 110*c*, determines whether or not the first to third cores 110*a*, 110*b*, and 110*c* are abnormal (step S211), and if it is determined that they are abnormal (step S211: YES), the processor 10 interrupts the processing related to the virtual device VM operating on the abnormal core (step S212). In the second embodiment, there are a plurality of virtual devices VM that have been operating in the abnormal core, and these are called a recovery target virtual device group.

Next, the processor 10 acquires the priority levels of the recovery target virtual device group and the operating virtual devices from the storage unit 11 (step S213). Then, the processor 10 selects the priority level of the recovery target virtual device having the highest priority level among the recovery target virtual device group (step S214). The recovery target virtual device with the highest priority level is called a recovery maximum priority level virtual device (recovery maximum priority level VM in the drawings).

Then, the processor 10 refers to the device configuration table 11*e*, and acquires the device configuration information of the virtual device VM to be executed last among the virtual devices VM having priority levels greater than or equal to the priority level of the recovery maximum priority level virtual device in the normal core (step S215). The device configuration information includes information indicating the physical device used by the virtual device VM to be executed last and setting values set for the used physical device.

Next, the processor 10 determines whether or not there are multiple recovery maximum priority level virtual devices (step S216). If it is determined that there are a plurality of recovery maximum priority level virtual devices (step S216: YES), the processor 10 calculates the recovery processing time of each recovery target virtual device for each normal core, based on the device configuration information acquired in step S215 and the device configuration information of each recovery target virtual device (step S217). Then, the processor 10 determines the combination of recovery destination cores that minimizes the total recovery processing time of each recovery target virtual device (step S218).

Note that the processor 10 may calculate the number of registers 114*a*, 114*b*, and 114*c* of the first to third physical devices 113*a*, 113*b*, and 113*c* whose settings need to be changed in each recovery target virtual device, that is, the change amount, and may determine the combination of recovery destination cores that minimizes the total change amount.

If it is determined that there are not a plurality of recovery maximum priority level virtual devices (step S216: NO), the processor 10 calculates the recovery processing time of the recovery target virtual device for each normal core based on the device configuration information acquired in step S215 and the device configuration information of the recovery target virtual device (step S219). Then, the processor 10 determines the recovery destination core with the shortest recovery processing time for the recovery target virtual device (step S220).

Note that the processor 10 may also determine the recovery destination core for which the number of registers 114*a*, 114*b*, and 114*c* of the first to third physical devices 113*a*, 113*b*, and 113*c* whose settings need to be changed in the recovery target virtual device, that is, the change amount, is the smallest.

The processor 10 that has completed the processing of step S218 or step S220 determines whether or not the recovery target virtual device can be recovered to the recovery destination core (step S221). If it is determined that recovery is possible (step S221: YES), the recovery target virtual device is registered in the scheduler 111*b* (step S222). If it is determined that recovery is not possible (step S221: NO), the processor 10 issues an error notification (step S223).

The processor 10 that has completed the processing of step S222 or step S223 updates the recovery target virtual device group (step S224). That is, the recovery maximum priority level virtual device identified in step S214 is excluded from the recovery target virtual device group. In other words, since the rest of the recovery target virtual devices other than the recovery maximum priority level virtual device for which the recovery processing has been completed in the processing of steps S215 to S223 execute the recovery processing, the recovery target virtual device group from which the recovery maximum priority level virtual device is excluded executes the following processing as the new recovery target virtual device group.

The processor 10 that has completed the processing of step S224 determines whether or not there is a restoration target virtual device (step S225). If it is determined that there is a recovery target virtual device (step S225: YES), the processor 10 returns the processing to step S214.

If it is determined that there is no recovery target virtual device (step S225: NO), the processor 10 determines whether or not one period (predetermined period) has been completed during execution of the recovery target virtual device (step S226). If it is determined that one period (predetermined period) has not been completed during execution of the recovery target virtual device (step S226: NO), or in other words, if the processing related to the recovery target virtual device has been completed without any problem before one period is completed, the processor 10 ends processing.

If it is determined that one period (predetermined period) has been completed during execution of the recovery target virtual device (step S226: YES), the processor 10 interrupts recovery of the recovery target virtual device (step S227), deletes the registered recovery target virtual device from the scheduler 111*b* (step S228), issues an error notification (step S229), and ends the processing.

According to the vehicle-mounted computer 1, the computer execution method, and the computer program 11*d* according to the second embodiment, when any one of the first to third cores 110*a*, 110*b*, and 110*c* of the processor 10 is abnormal and a plurality of recovery target virtual devices that were operating on the abnormal core are to be migrated to one of the other normal cores, it is possible to efficiently migrate the virtual device VM such that the total processing load for changing the setting of the register values of the physical device, the total setting change processing time, or the total change amount of the register is minimized.

Also, if there are a plurality of virtual devices VM operating on an abnormal core with an abnormality, the processor 10 can preferentially migrate a virtual device VM with a high priority level among the plurality of virtual devices VM operating on the abnormal core to a normal core.

Furthermore, if there are a plurality of virtual devices VM operating on the abnormal core, the processor 10 can specify the core that is the migration destination of the virtual device VM such that the total change amount of the register values of the first to third physical devices 113*a*, 113*b*, and 113*c* or the total processing time needed for changing the register values of the first to third physical devices 113*a*, 113*b*, and 113*c* when migrating the plurality of virtual devices VM that were operating on the abnormal core to the other plurality of normal cores is minimized, and can migrate a plurality of virtual devices VM that were operating on the abnormal core to the specified normal core that is the migration destination.

The invention claimed is:

1. A vehicle-mounted computer comprising a physical resource including a processor with three or more cores and a physical device having a register, the vehicle-mounted computer generating three or more virtual devices by allocating the physical resource through time-division, wherein the processor:

determines whether or not the plurality of cores are operating to identify a non-operable core, when a non-operable core is identified, the processor identifies, for each of the other cores that is operating, a change amount of a register value of the physical device or processing time needed for changing a register value of the physical device when the virtual device is migrated to that core;

specifies, as a migration destination, a core having the least change amount or the least processing time needed for changing the register value among the other cores; and migrates the virtual device that was operating on the non-operable core to the core that is the migration destination.

2. The vehicle-mounted computer according to claim 1, wherein the processor specifies, as the core that is the migration destination, the core with the smallest change amount of the register value of the physical device when the virtual device that was operating on the one core is migrated to the other cores.

3. The vehicle-mounted computer according to claim 1, wherein the processor specifies, as the core that is the migration destination, the core with the smallest processing time needed for changing the register value of the physical device when the virtual device that was operating on the one core is migrated to the other cores.

4. The vehicle-mounted computer according to claim 2, further including, a device configuration table including register values to be set in the physical device to be used by the respective plurality of virtual devices, wherein the processor refers to the device configuration table and specifies, as the core that is the migration destination, the core with the smallest change amount of the register value of the physical device when the virtual device that was operating on the one core is migrated to the other cores.

5. The vehicle-mounted computer according to claim 1, wherein the processor specifies the core that is the migration destination of the virtual device that was operating on the one core, based on information indicating the physical device to be used by the virtual device to be executed last among the virtual devices that are to operate on the other cores, and device configuration information including a register value to be set in the physical device that is to be used.

6. The vehicle-mounted computer according to claim 1, wherein the plurality of virtual devices have priority levels for executing processing, and the processor specifies the core that is the migration destination of the virtual device, based on the change amount from the register value of the physical device to be used by the virtual device that is to be executed last and has a higher priority level than the virtual device that was operating on the one core, among the virtual devices that are to operate on the other cores.

7. The vehicle-mounted computer according to claim 1, wherein the plurality of virtual devices have priority levels for executing processing, and the processor specifies the core that is the migration destination of the virtual device, based on the processing time needed for changing the register value of the physical device to be used by the virtual device that is to be executed last and has a higher priority level than the virtual device that was operating on the one core, among the virtual devices that are to operate on the other cores.

8. The vehicle-mounted computer according to claim 6, wherein the priority level is determined based on an ASIL and QM of a functional safety standard for an automobile.

9. The vehicle-mounted computer according to claim 1, wherein the processor causes at least one virtual device of the plurality of virtual devices to operate periodically at a predetermined period and the other virtual devices to operate non-periodically, and, based on the change amount of the register value of the physical device to be used by the virtual device that operates periodically at a predetermined period among the virtual devices that are to operate on the other cores, specifies the core that is the migration destination of the virtual device.

10. The vehicle-mounted computer according to claim 1, wherein the processor causes at least one virtual device of the plurality of virtual devices to operate periodically at a predetermined period and the other virtual devices to operate non-periodically, and, based on the processing time needed for changing the register value of the physical device to be used by the virtual device that operates periodically at a predetermined period among the virtual devices that are to operate on the other cores, specifies the core that is the migration destination of the virtual device.

11. The vehicle-mounted computer according to claim 1, wherein the plurality of virtual devices have priority levels for executing processing, and if there are a plurality of the virtual devices that were operating on the one core, the processor preferentially migrates the virtual device with a high priority level among the plurality of virtual devices that were operating on the one core to the other cores.

12. The vehicle-mounted computer according to claim 1, wherein if there are a plurality of the virtual devices that were operating on the one core, the core that is the migration destination of the virtual device is specified based on the total change amount of the register value of the physical device when migrating to the other cores.

13. The vehicle-mounted computer according to claim 1, wherein if there are a plurality of the virtual devices that were operating on the one core, the core that is the migration destination of the virtual device is specified based on the total processing time needed for changing the register value of the physical device when migrating to the other cores.

14. The vehicle-mounted computer according to claim 1, wherein if the predetermined period is completed during execution of the virtual device that is to be migrated, the processor interrupts migration of the virtual device and issues an error notification.

15. A computer execution method to be performed by a vehicle-mounted computer that includes a physical resource including a processor with a plurality of three or more cores and a physical device having a register, and generates a plurality of three or more virtual devices by allocating the physical resource through time-division, the method comprising:

determining whether or not the plurality of cores are operating to identify a non-operable core, identifying, when the non-operable core is identified, a change amount of a register value of the physical device or processing time needed for changing a register value of the physical device when the virtual device is migrated to the other cores;

specifying, as a migration destination, a core having the least change amount or the least processing time needed for changing the register value among the other cores; and migrating the virtual device that was operating on the non-operable core to the core that is the migration destination.

16. A computer program product for a vehicle-mounted computer, that includes a physical resource including a processor with a plurality of three or more cores and a physical device having a register, and generates a plurality of three or more virtual devices by allocating the physical resource through time-division, the computer program product comprising a non-transitory, machine-readable medium storing instructions which, when executed by at least one programmable processor, causes at least one programmable processor to cause the processor to:

determine whether or not the plurality of cores are operating to identify a non-operable core, identify, when a non-operable core is identified, a change amount of a register value of the physical device or processing time needed for changing a register value of the physical device when the virtual device is migrated to the other cores, specify, as a migration destination, a core having the least change amount or the least processing time needed for changing the register value among the other cores; and migrate the virtual device that was operating on the non-operable core to the core that is the migration destination.

* * * * *